US009558481B2

(12) United States Patent
Bauer et al.

(10) Patent No.: US 9,558,481 B2
(45) Date of Patent: Jan. 31, 2017

(54) SECURE ACCOUNT PROVISIONING (75) Inventors: John Bauer, Downingtown, PA (US); Glenn Curtiss McMillen, Downingtown, PA (US); Eric Crozier, Hockessin, DE (US); Christine Ann Schuetz, Chadds Ford, PA (US); Garry Lloyd, Pitsford (GB)

(73) Assignee: BARCLAYS BANK PLC, London (GB)

( * ) Notice: Subject to any disclaimer, the term of this patent is extended or adjusted under 35 U.S.C. 154(b) by 618 days.

(21) Appl. No.: 12/891,866

(22) Filed: Sep. 28, 2010

(65) Prior Publication Data

US 2012/0078735 A1    Mar. 29, 2012

(51) Int. Cl.
*G06Q 20/30* (2012.01)
*G06Q 20/40* (2012.01)
*G06Q 20/20* (2012.01)
*G06Q 20/32* (2012.01)

(52) U.S. Cl.
CPC ............ *G06Q 20/20* (2013.01); *G06Q 20/322* (2013.01); *G06Q 20/3278* (2013.01); *G06Q 20/40* (2013.01)

(58) Field of Classification Search
CPC .... G06Q 20/102; G06Q 20/32; G06Q 20/325; G06Q 20/40; G06Q 20/20; G06Q 20/3223; G06Q 20/3226; G06Q 20/3227; G06Q 20/3229; G06Q 20/3255; G06Q 20/3278; G06Q 20/341; G06Q 20/3552; G06Q 20/4014
See application file for complete search history.

(56) References Cited

U.S. PATENT DOCUMENTS

| | | | | |
|---|---|---|---|---|
| 6,607,136 | B1* | 8/2003 | Atsmon | G06F 21/34 235/487 |
| 7,203,477 | B2* | 4/2007 | Coppinger et al. | 455/403 |
| 7,469,151 | B2 | 12/2008 | Khan et al. | |
| 7,562,813 | B2 | 7/2009 | Humphrey et al. | |
| 7,873,573 | B2* | 1/2011 | Realini | 705/39 |
| 8,121,945 | B2* | 2/2012 | Rackley, III | G06Q 20/042 235/380 |
| 2004/0107170 | A1* | 6/2004 | Labrou | G06Q 20/02 705/64 |
| 2004/0159700 | A1* | 8/2004 | Khan | G06Q 20/02 235/380 |
| 2005/0021400 | A1* | 1/2005 | Postrel | G06Q 20/105 705/14.24 |
| 2005/0027543 | A1* | 2/2005 | Labrou | G06Q 20/02 705/26.35 |
| 2005/0187873 | A1* | 8/2005 | Labrou | G06Q 20/02 705/40 |
| 2005/0269401 | A1* | 12/2005 | Spitzer | G06Q 20/32 235/380 |
| 2005/0269402 | A1* | 12/2005 | Spitzer | G06Q 20/04 235/380 |

(Continued)

FOREIGN PATENT DOCUMENTS

WO    WO 2010/033944    3/2010

*Primary Examiner* — Ryan Zeender
*Assistant Examiner* — Dana Amsdell
(74) *Attorney, Agent, or Firm* — Cowan, Liebowitz & Latman, P.C.; Steven D. Underwood (57) ABSTRACT A mobile payment system and method are described that facilitates the secure and real time user authentication and activation of a mobile payment account for a user portable electronic device over a communications network.

11 Claims, 8 Drawing Sheets

(56) References Cited

U.S. PATENT DOCUMENTS

| | | | |
|---|---|---|---|
| 2006/0040667 A9* | 2/2006 | Coppinger et al. | 455/436 |
| 2006/0156385 A1* | 7/2006 | Chiviendacz et al. | 726/2 |
| 2006/0165060 A1* | 7/2006 | Dua | G06Q 20/20 370/352 |
| 2007/0179885 A1* | 8/2007 | Bird | G06Q 20/04 705/39 |
| 2007/0233615 A1* | 10/2007 | Tumminaro | 705/75 |
| 2007/0293155 A1* | 12/2007 | Liao | G06Q 20/32 455/41.2 |
| 2008/0126145 A1* | 5/2008 | Rackley, III et al. | 705/7 |
| 2008/0270302 A1* | 10/2008 | Beenau et al. | 705/42 |
| 2009/0024533 A1* | 1/2009 | Fernandes | G06Q 20/401 705/75 |
| 2009/0069050 A1* | 3/2009 | Jain | G06K 19/07739 455/558 |
| 2009/0210308 A1* | 8/2009 | Toomer | G06Q 20/20 705/16 |
| 2009/0327131 A1* | 12/2009 | Beenau | G06Q 20/32 705/44 |
| 2010/0057580 A1* | 3/2010 | Raghunathan | G06Q 20/04 705/17 |
| 2010/0312700 A1* | 12/2010 | Coulter | G06Q 20/02 705/42 |
| 2011/0140841 A1* | 6/2011 | Bona | G06K 19/06187 340/5.83 |
| 2011/0218911 A1* | 9/2011 | Spodak | G06Q 20/105 705/41 |
| 2012/0074232 A1* | 3/2012 | Spodak | G06K 19/06206 235/492 |
| 2012/0095852 A1* | 4/2012 | Bauer | G06Q 20/105 705/16 |
| 2012/0136732 A1* | 5/2012 | McMillen | G06Q 20/105 705/16 |
| 2012/0136786 A1* | 5/2012 | Romagnoli | G06Q 20/10 705/44 |
| 2014/0222682 A1* | 8/2014 | Dua | G06Q 20/20 705/44 |

* cited by examiner

SECURE ACCOUNT PROVISIONING

FIELD OF THE INVENTION

This invention relates to a mobile payment account system, and more particularly to activating a mobile payment account on a mobile device to enable contactless payment at an electronic point of sale.

BACKGROUND OF THE INVENTION

Mobile payment account systems are generally known, in which portable electronic devices are configured to provide payment from an electronic wallet. Typically, these portable electronic devices are configured to enable a contactless communication with a merchant Point Of Sale (POS) terminal to carry out a payment transaction, for example using near field communication (NFC) technology.

Such conventional mobile payment systems typically involve a complicated process for provisioning a mobile payment account on the portable electronic device. Customers expect a certain degree of security and peace of mind that their sensitive identification and account details are protected from theft, and therefore known account provisioning systems involve a time consuming activation process which often requires the customer to, for example, post in a copy of documents to verify their identity, telephone the account issuer to provide verbal confirmation of their identity, or login to a website to complete a lengthy authentication process. This results in significant delays between a customer requesting a new mobile payment account and the time when the mobile account is actually provisioned and ready for use to carry out payment transactions.

What is desired is a more efficient account provisioning system and method which enables substantially real time activation of a new mobile payment account and which facilitates expedient security measures to prevent fraudulent use and identity theft.

SUMMARY OF THE INVENTION

In one aspect of the present invention, a mobile payment account activation system and method are provided for facilitating the automated activation of a mobile payment account stored on a portable electronic device, comprising an account activation unit for automatically authenticating a user associated with the mobile payment account by transmitting validation data to the portable electronic device and for activating the provisioned mobile payment account after the user has been authenticated based on the transmitted validation data.

In another aspect, the present invention provides a mobile payment account activation system for facilitating the automated activation of a mobile payment account stored on a portable electronic device, comprising an account activation unit for automatically authenticating a user associated with the mobile payment account by transmitting validation data to the portable electronic device and for activating the provisioned mobile payment account after the user has been authenticated based on the validation data.

In yet another aspect, a mobile device for use in a mobile payment system is provided, comprising a communication network interface, a secure memory for storing data associated with at least one inactive mobile payment account data, and an account activation module operable to receive validation data from the account provisioning system to facilitate automatic authentication of the user and automatically activation of the mobile payment account.

Preferably, the validation data does not facilitate payment from the activated mobile payment account. Preferably, the validation data used in the automated activation process comprises one or more identification and validation questions that are answered by the user via the portable electronic device to authenticate the user's identity. According to another aspect, enhanced out of band questions may be presented to the user via the portable electronic device depending for example on predetermined levels of security.

In another aspect of the invention, a mobile payment account activation system and method are provided for facilitating the automatic activation of a mobile payment account in a mobile payment system, the mobile payment account activation system arranged to store a plurality of mobile payment accounts associated with a user and comprising an account activation unit for receiving a user selection of an inactive mobile payment account and automatically activating the selected mobile payment account after the user has been authenticated.

In another aspect, there is provided a computer program arranged to carry out the above methods when executed by a computer or system.

BRIEF DESCRIPTION OF THE DRAWINGS

There now follows, by way of example only, a detailed description of embodiments of the present invention, with references to the figures identified below.

FIG. 3, which comprises

FIG. 4, which comprises

FIG. 5, which comprises

DETAILED DESCRIPTION OF EMBODIMENTS OF THE INVENTION

Overview

A specific embodiment of the invention will now be described for a process involving a mobile payment system activating the mobile payment account for use on a user mobile device at a merchant's electronic point of sale terminal. In this embodiment, the process includes steps for securely provisioning the mobile payment account for a user but as those skilled in the art will appreciate, the activation process may be a separate process operating on mobile payment account data pre-provisioned on the mobile device.

Figure 1:
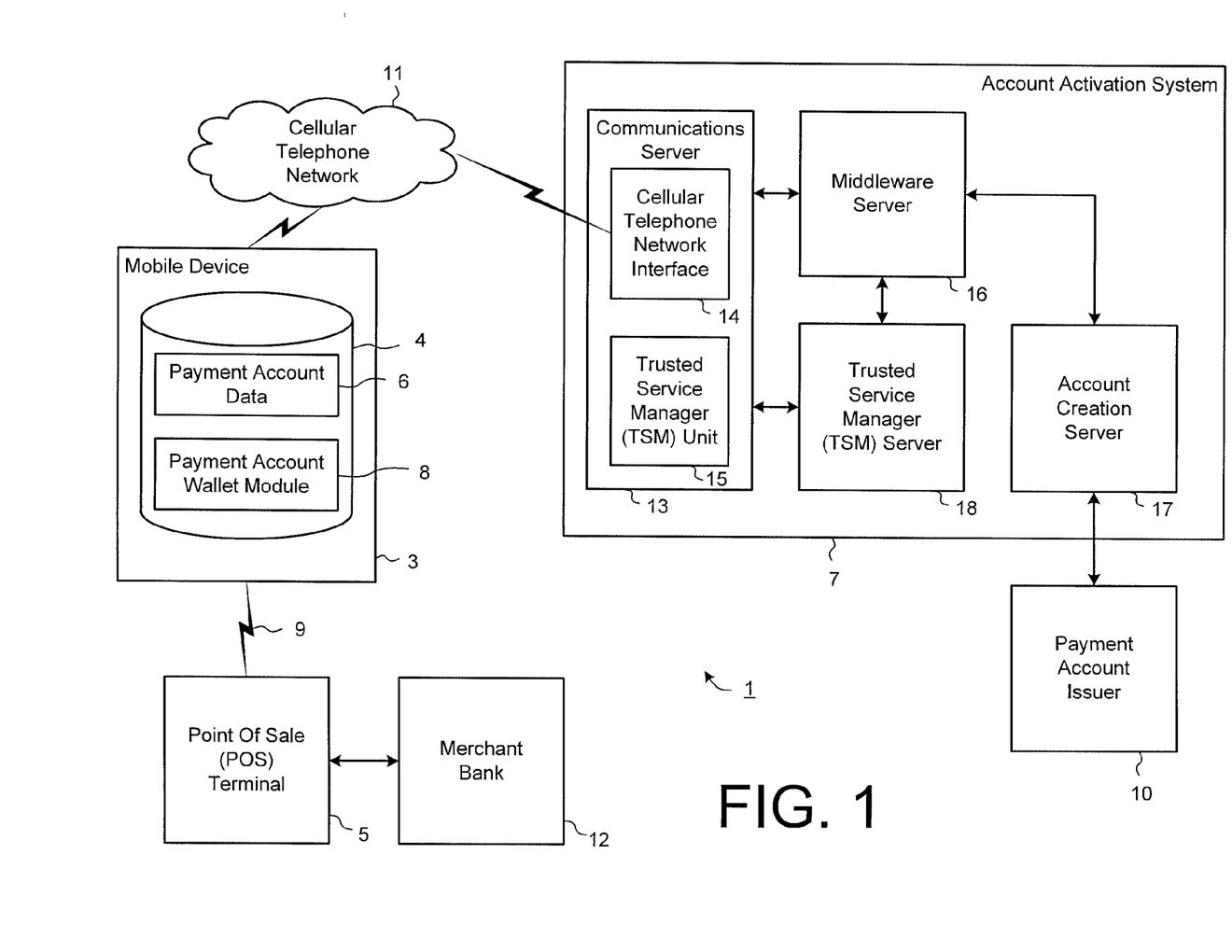
FIG. 1 is a block diagram showing the main components of a mobile payment system according to an embodiment of the invention.

Referring to FIG. 1, the mobile payment system 1 of the present embodiment comprises a mobile device 3, a merchant's electronic Point Of Sale (POS) terminal 5 and an account activation system 7 which communicate electronically with one another. In this embodiment, the mobile device 3 and the electronic POS terminal 5 communicate with one another via a contactless communication link 9. As those skilled in the art will appreciate, this contactless communication link 9 may be for example a near field communication (NFC) link, an infra-red link, an ultra-sonic link, an optical link, a radio frequency (eg. RFID) link, a wireless link such as Bluetooth or Wi-Fi based on the IEEE 802.11 standards, or any other communication link that does not require direct physical contact. The mobile device 3 also communicates with the account activation system 7 via a cellular telephone network 11.

As shown in FIG. 1, the mobile device 3 in this embodiment includes a secure memory 4 storing payment account data 6 for one or more mobile payment accounts that have been set up on the mobile device 3. The secure memory 4 may for example be a Universal Integrated Circuit Card (UICC) secure element as is known in the art. As those skilled in the art will appreciate, other forms of mobile handset software and/or hardware may be implemented to provide built-in secure electronic wallet functionality for accessing the secure memory 4, including encryption and decryption of the payment account data 6 as necessary. For example, the mobile device 3 may be configured with built-in functionality providing access to secure memory on the Subscriber Identity Module (SIM) card in the mobile device 3. In the present embodiment, payment account data 6 for a mobile payment account that is securely stored in the mobile device 3 may include data defining an amount of pre-paid funds that have been transferred from the user's payment account issuer 10 to that mobile payment account. Alternatively or additionally, the payment account data 6 may include data identifying a user's account at a payment account issuer 10 from which funds can be transferred to the merchant bank to complete a transaction. In this way, the electronic wallet includes a payment account that may be linked to multiple funding sources, such as a pre-paid account, deposit account and/or credit account. The mobile payment account may be provisioned for the user by the account activation system 7.

The mobile device 3 also includes a payment account wallet application module 8 storing processing instructions used to control the operation of the mobile device 3, for example to i) request creation of a new mobile payment account, ii) handle a secure mobile payment account activation process, and/or iii) process a transaction with a merchant via the electronic POS terminal 5 to effectively transfer funds from the mobile payment account on the mobile device 3 to the merchant. As those skilled in the art will appreciate, the payment account wallet application module 8 may be provided as one or more software components of an operating system running on the mobile device 3 or as one or more separate software applications installed on the mobile device 3. Such software applications may be configured to run as background applications on the mobile device 3 that monitor for and activate upon receipt of appropriate messages or events, or may be launched by the user, so as to carry out the above operations. Alternatively, the payment account wallet application module 8 may be stored in the secure memory 4, and may for example be loaded into a virtual machine of the mobile device 3 to provide the functionality of the present embodiment.

Before the user can use the mobile device 3 to carry out transactions with a merchant electronic POS terminal 5, a new mobile payment account may be provisioned for the user, for example in response to a user requesting a new mobile payment account via the mobile device 3. Payment account data 6 may be created by the account activation system 7 for a new mobile payment account, and the account activation system 7 may be arranged to immediately transmits the payment account data 6 to the mobile device 3 for storage in the secure memory 4 of the mobile device 3. As those skilled in the art will appreciate, this is just one way in which an inactive mobile payment account can be provisioned on the mobile device 3 and any other method of delivery is envisaged. A notification message may be displayed by the mobile device 3 to alert the user that the mobile payment account is ready but requires authentication via the mobile payment account module 8 before the mobile payment account can be activated.

A secure activation process is then carried out between the mobile device 3 and the account activation system 7 to authenticate the identity of the user trying to activate the new mobile payment account. Once the authentication is successful, the account activation system 7 activates the mobile payment account. The activated mobile payment account data stored in the secure memory 4 of the mobile device 3 can then be used to carry out transactions with a merchant electronic POS terminal 5 via the contactless communication link 9, whereby a requested amount of funds can be transferred from the mobile payment account stored in the mobile device 3 to the merchant's bank 12.

Account Activation System

The account activation system 7 in the mobile payment system 1 will now be described in more detail with reference to FIG. 1, which shows the elements of the account activation system 7 used in this embodiment. As shown, the account activation system 7 may include a communications server 13, a middleware server 16, an account creation server 17 and a Trusted Service Manager (TSM) server 18, which communicate electronically with one another. In this embodiment, the servers communicate with one another via secure network links, for example over a private Local Area Network (LAN), a VPN connection, or other dedicated secure connection. As those skilled in the art will appreciate, although the components of the payment account system in this embodiment are provided as separate servers, one or more of the servers could be provided as software and/or hardware modules in the same server.

As shown in FIG. 1, the communications server 13 communicates with the mobile device 3 over the cellular telephone network 11 via a cellular telephone network interface 14. As part of the account activation process which will be described in more detail below, the communications server 13 may receive a request for activation of a new mobile payment account from the mobile device 3 and, in response, passes a request to the middleware server 16 to initiate the activation process for a new mobile payment account. The middleware server 16 also maintains a state of the mobile payment account for servicing throughout the account activation processes. The middleware server 16 may also performs event and notification handling to the other servers in the account provisioning system 7 throughout the account activation processes.

If creation of a new mobile payment account is required, the middleware server 16 may initiate a provisioning process by sending an instant provisioning request to the account creation server 17 via a secure network communication link, such as a web services communication link. As is known in present payment account systems, the account creation server 17 establishes an account at a payment account issuer 10 in response to receiving an instant provisioning request. This process typically involves passing account details from the instant provisioning request to the payment account issuer 10, or any other known card payment account processing platform (pre-paid, credit deposit), to establish a new account at the payment account issuer 10. Once the new account has been established by the payment account issuer 10, the account creation server 17 may receive an embossing data file from the payment account issuer 10 which would typically be used to create a physical plastic payment card for the user. The account creation server 17 may create the mobile payment account data 6 including data from the embossing data file received from the payment account issuer 10 as well as additional data pertaining to the mobile device 3 and to the mobile user requesting the new account which will be used in the mobile account activation process. The mobile payment account data 6 may then be passed to the TSM server 18 via the middleware 16, which may perform logical data preparation of the received mobile payment account data 6 by forming appropriate commands to be written to the secure memory 4 of the mobile device 3. As those skilled in the art will appreciate, the precise form of the data may depend on the particular implementation of the secure memory 4 of the mobile device 3 and/or the payment association scheme program for facilitating payment. The TSM server 18 may also perform encryption of the mobile payment account data 6, for example of the sensitive payment account information in the mobile payment account data 6 such as the payment keys. The TSM server 18 may then passes the encrypted payment account data 6 of the provisioned inactive mobile payment account to the mobile device 3 via the communications server 13 and the cellular telephone network 11.

As will be described below, the middleware server 16 also handles authentication of the mobile user through validation messages communicated between the mobile device 3 and the middleware server 16 via the communications server 13. The middleware server 16 stores validation data pertaining to the mobile user requesting the new account until the mobile payment account has been activated. Alternatively or additionally, the validation data may be stored and provided by the payment account issuer 10 or by a third party system (not shown). The validation data may be in the form of identification and validation (ID&V) questions and answers, based on ID&V information associated with the mobile payment account which is stored on the middleware server 16 or payment account issuer 10, and/or based on additional ID&V information provided by a third party. The ID&V information may include publicly available information that only the user would know to be the answers, and therefore the ID&V information does not need to be transmitted over the air nor made available through the account authentication application on the mobile device 3. After the middleware server 16 and the payment account issuer 10 authenticate the mobile user, the mobile payment account is then activated by the middleware server 16 and the payment account issuer 10 to enable payments to be made from the mobile payment account.

The communications server 13 also includes a separate TSM unit 15 for securely routing the payment account data 6 created by account activation system 7 to the mobile device 3. In particular, the TSM unit 15 in the communications server 13 does not access any of the sensitive data stored in the encrypted payment account data 6 that is routed to the mobile device 3 via the cellular telephone network interface 14.

Mobile Device

Figure 2:
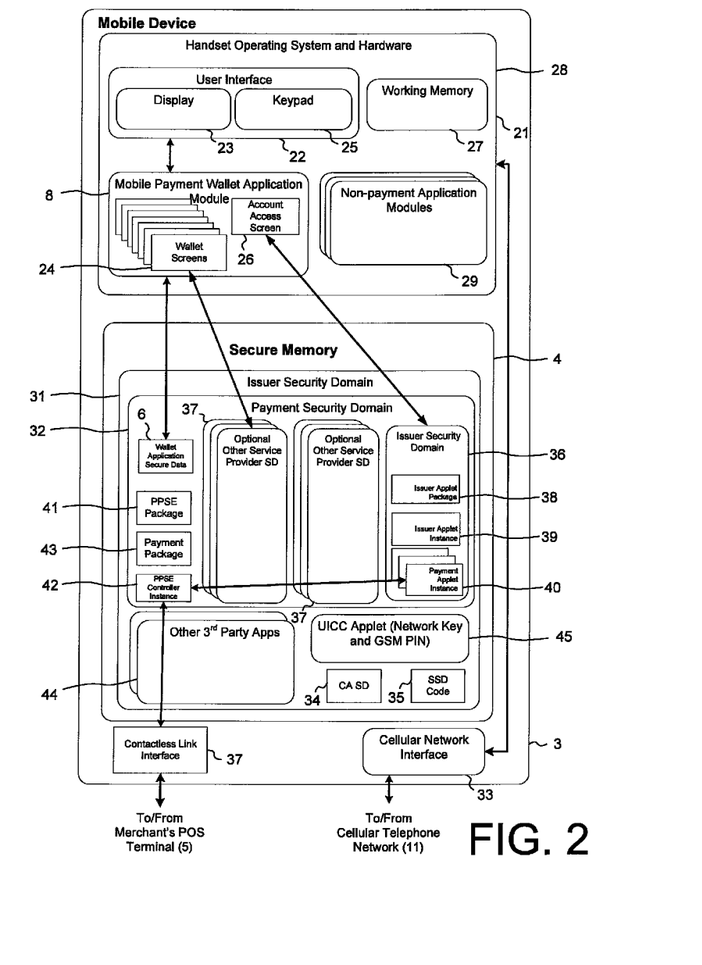
FIG. 2 is a block diagram showing the main elements of a mobile device shown in FIG. 1.

FIG. 2 shows the elements of the mobile device 3 used in this embodiment, which in this embodiment is a mobile handset. As shown, the handset operating system and hardware includes a user interface 22 arranged to process inputs from a keypad 23 and to control output on a display 25. As those skilled in the art will appreciate, the keypad 23 and display 25 may be provided as separate hardware entities of the mobile device 3 or may alternatively be provided as an integrated entity, for example as a touch screen user interface element as is known in the art. A working memory 27 is provided for use by the handset operating system and hardware units 21.

As mentioned above, the mobile device 3 includes a secure memory 4. The mobile device 3 is operable to receive the payment account data 6 and activation request messages from and send validation messages to the account activation system 7 via a cellular telephone network interface 33 and the cellular telephone network 11, and to store the received payment account data 6 in the secure memory 4. The mobile device 3 is also operable to receive transaction authorization request messages from and send authorization messages to the merchant's POS terminal 5 via a contactless communications link interface 37 and the contactless communications link 9.

The mobile device 3 also includes a payment account wallet application module 8 as mentioned above, which stores processing instructions used to control the operation of the mobile device 3 to perform the various mobile payment account processes, as will be described in detail below. As schematically illustrated in FIG. 2, the payment account application wallet module 8 may include an account creation sub-module which stores processing instructions to create a request for a new mobile payment account if desired, in response to user input from the user interface 22. The request may be transmitted to the account activation system 7 via the cellular telephone network interface 33. The payment account wallet application module 8 also includes an account activation sub-module which stores processing instructions used to carry out a secured account validation and activation process in response to user input from the keypad 23 and account activation request messages received from the account activation system 7 via the cellular telephone network interface 33. The payment account module 8 also includes a transaction authorization sub-module which stores processing instructions used to control the operation of the controller 21 to carry out and authorize a transaction in response to user input from the keypad 23 and transaction authorization request messages received from the merchant's POS terminal 5 via the contactless communications link interface 37. The mobile payment wallet application module 8 may be configured to store a plurality of wallet screens 24 and an account access screen 26 which may be output on display 23 of the user interface 22 to facilitate user interaction with the mobile payment wallet application module 8. The mobile payment wallet application module 8 may also store one or more non-payment application modules 29 including processing instructions used to control the operation of the mobile device 3 to perform other non-payment related processes. As those skilled in the art will appreciate, although the above discussed functionality is described as being provided by a single mobile payment wallet application module 8 on the mobile device 3, as an alternative, the validation and authentication functionality may be provided as a account authentication application separate from the transaction authorization functionality provided as a transaction processing application, for example. Additionally, the account authentication application and the transaction processing application may be prepared by the TSM server 18 of the account activation system 7 and transmitted for storage in the mobile device 3 via the communications server 13 in advance of the account activation process. As yet a further modification, those skilled in the art will appreciate that the payment account module 8 may instead provided as one or more hardware and/or software components of the mobile device 3.

Also schematically illustrated in the exemplary embodiment of FIG. 2 are a plurality of security domains which may be implemented in the secure memory 4 of the mobile device 3. The security domains serve to segment the management and accessibility of various parties functionality and sensitive data. As shown in FIG. 2, an issuer security domain 31 may include a payment security domain 32, a Controlling Authority (CA) security domain 34, and a Supplementary Security Domain (SSD) code 35. The payment security domain includes the wallet application secure data 6, along with an issuer security domain 36 and one or more optional other service provider security domains 37. The issuer security domain 36 may include an issuer applet package 38, an issuer applet 39, and one or more payment applet instances 40 which enable the transaction processing functionality using an activated mobile payment account. The payment security domain 32 may also include a Proximity Payment System Environment (PPSE) package 41, a PPSE controller instance 42 for facilitating the transaction processing functionality between the payment applet instances 40 and the contactless link interface 37, and a payment package 43.

The mobile device 3 may also include one or more other third party application modules 44 stored in the secure memory 4, for example an application module related to third party loyalty scheme. The secure memory 4 may also stores a UICC applet 45 which is an application to manage and hold the mobile network operator's functionality and secure information, such as a network key and GSM PIN.

Account Activation Process

Figure 3A:
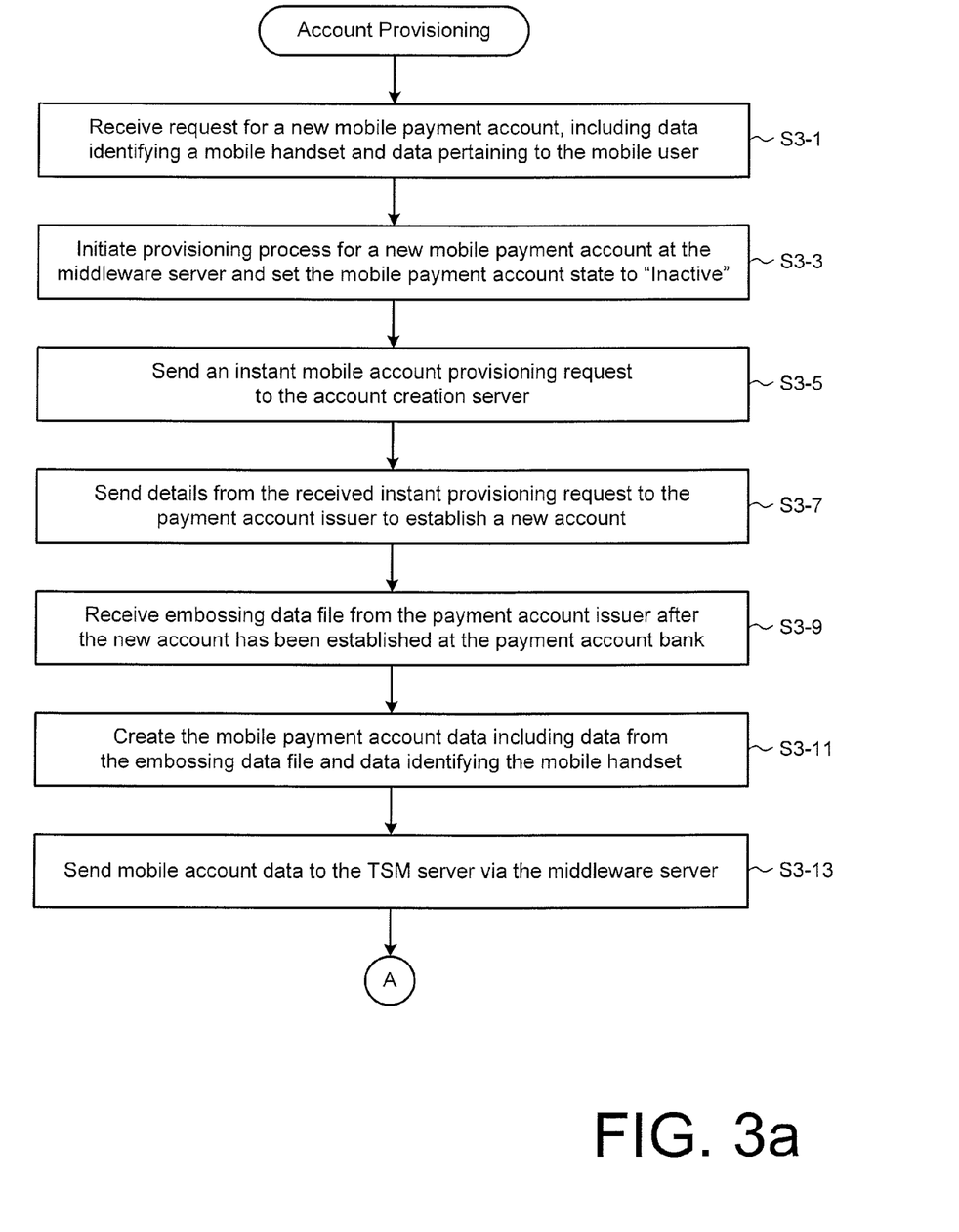
FIGS. 3a and 3b, is a flow diagram illustrating the main processing steps performed by the components in FIG. 1 in provisioning a mobile payment account.
Figure 3B:
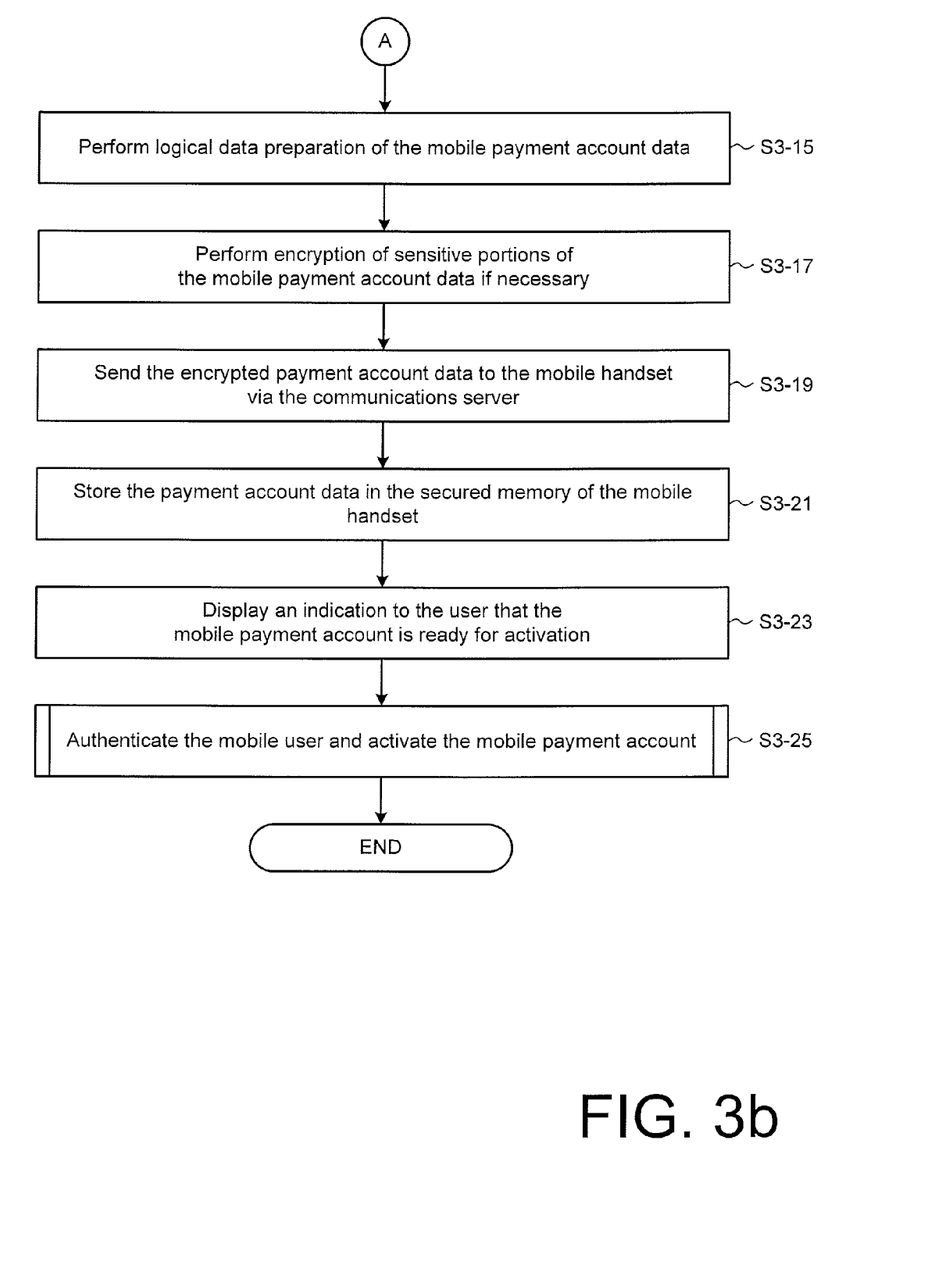

A brief description has been given above of the components forming part of the mobile payment system 1 of this embodiment. A more detailed description of the operation of these components in this embodiment will now be given for an example computer-implemented mobile payment account provisioning process in a situation where a user wishes to request a new mobile payment account via the mobile device 3, with reference to the flow diagram of FIG. 3. As mentioned above, this process may not be necessary if data for an inactive mobile payment account has already been provisioned on the mobile device 3 by another method.

As shown in FIG. 3, the automated process begins at step S3-1 where the middleware server 16 in the account provisioning system 7 may receive a request for a new mobile payment account from the mobile device 3 via the communications server 13, the request including data identifying the mobile device 3 and details entered by the user for provisioning the new mobile payment account. As is common under normal and customary banking processes and systems, the details may include for example the user's name, address and birth date. Next, at step S3-3, the middleware server 13 may initiate an account provisioning process for a new mobile payment account and sets the servicing state of the new mobile payment account to "Inactive" to indicate that the account has just been created and has yet to be transmitted to the mobile device 3 for authentication and activation. A mobile payment account with an "Inactive" state is not available for use by the mobile device 3 to carry out transactions. The middleware server 13 may be configured to store a database of created accounts to maintain the respective states for provisioning.

As part of the account provisioning process if necessary, at step S3-5, the middleware server 16 may send an instant mobile account provisioning request (which includes the data identifying the mobile device 3 and the user details) to the account creation server 17. At step S3-7, the account creation server 17 may extract the user details from the received instant mobile account provisioning request and sends the extracted user details to the payment account issuer 10 to establish a new account at the payment account issuer 10. At step S3-9, the account creation server may receive an embossing data file for the new account from the payment account issuer 10 after the new account has been established at the payment account issuer 10. At step S3-11, the account creation server 17 may then create mobile payment account data 6 for a new mobile payment account based on the received embossing data file. The new mobile payment account data 6 includes the data identifying the mobile device 3 received in the instant mobile account provisioning request.

At step S3-13, the account creation server 17 may then send the mobile payment account data 6 for the new provisioned mobile payment account to the TSM server 18 via the middleware server 16. At step S3-15, the TSM server 18 may prepare the mobile payment account data 6 for transmission to and storage on the mobile device 3. This may involve logical data preparation of the mobile payment account data 6 by forming appropriate commands to be written to the secure memory 4 of the mobile device 3. At step S3-17, the TSM server 18 may also perform encryption of the sensitive payment account information in the mobile payment account data 6 such as the payment keys, if necessary. This encryption may be performed based on known software and/or hardware functionality of the mobile device 3. At step S3-19, the TSM server 18 may send the encrypted payment account data 6 to the mobile device 3 via the communications server 13 and the cellular telephone network 11, and at step S3-21, the mobile device 3 may store the received payment account data 6 of the mobile payment account in the secure memory 4.

As the provisioned mobile payment account is not activated at this stage, at step S3-23, the mobile device 3 displays an indication to notify the user that a mobile payment account has been provisioned and is ready for activation. At step S3-25, the middleware server 16 carries out a user authentication and account activation process as will be described below, to activate the mobile payment account stored on the mobile device 3 ready for use by the transaction authorization sub-module 45, as well as to update the activation state of the mobile payment account at the account activation system 7 and/or the payment account issuer 10.

Account Activation Process

Figure 4A:
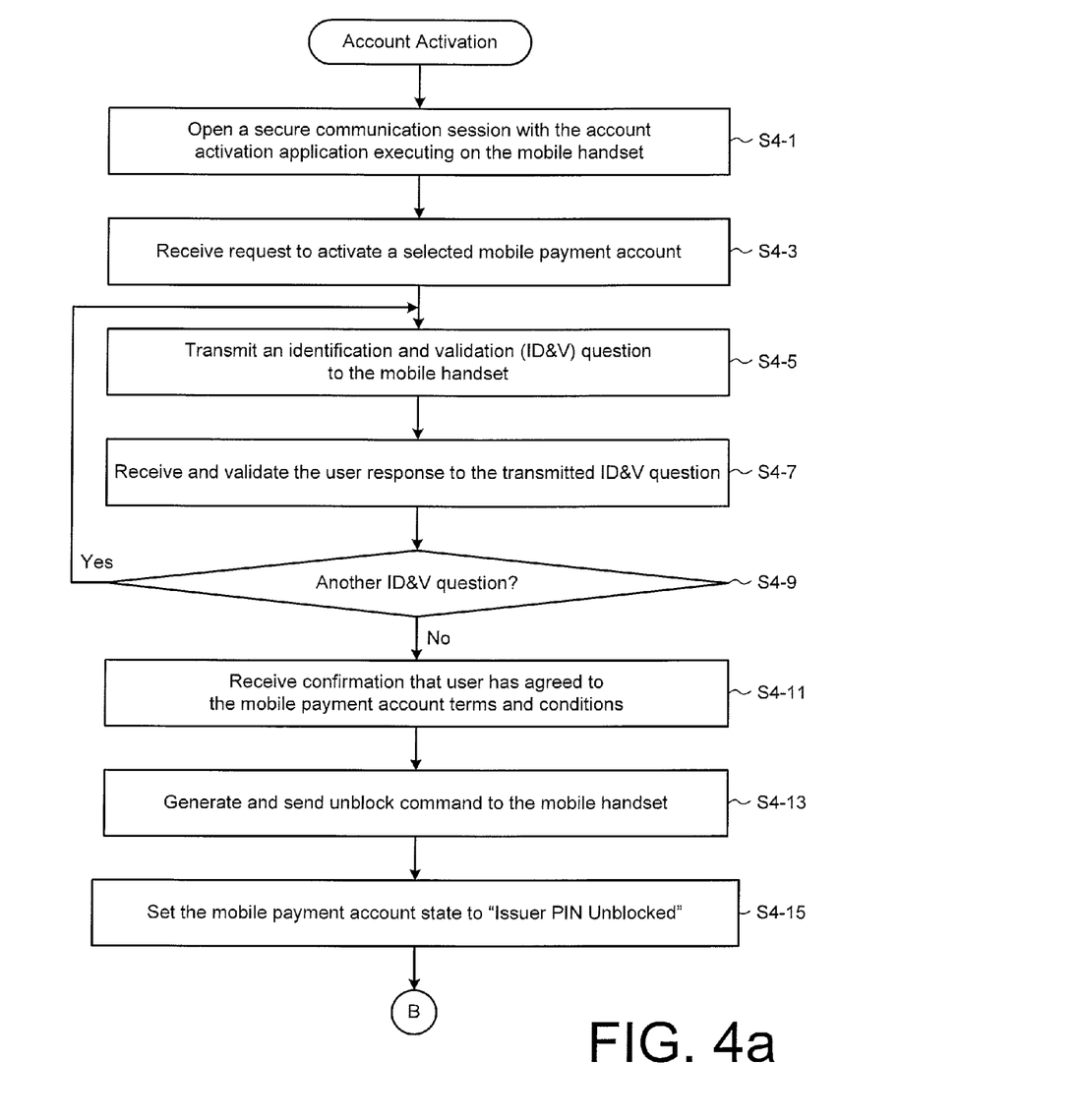
FIGS. 4a and 4b, is a flow diagram illustrating the main processing steps performed by the components in FIG. 1 in activating a provisioned mobile payment account.
Figure 4B:
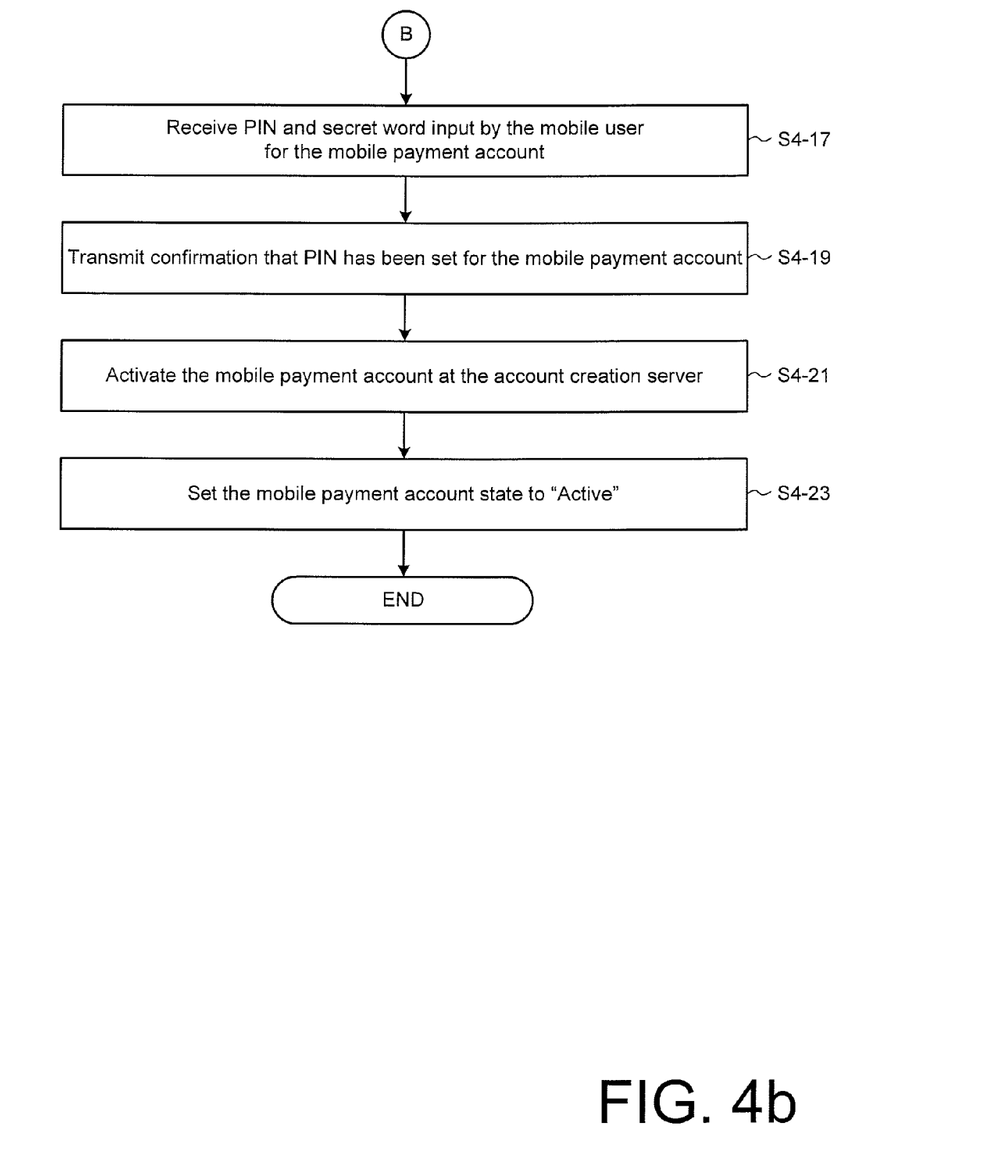
Figure 5A:
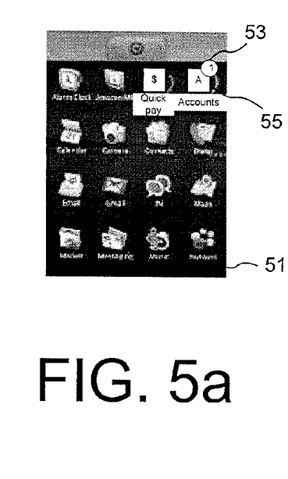
FIGS. 5a to 5f, illustrates a sequence of screens displayed by the mobile device to the user during the mobile payment account activation processing illustrated in FIG. 4.
Figure 5B:
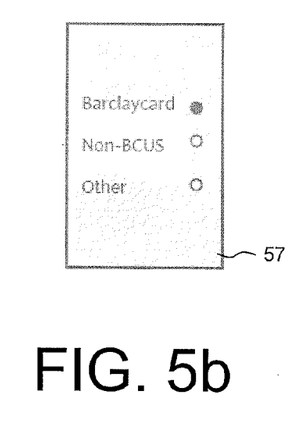

An example of a process flow of the mobile payment system 1 for handling a user authorization and mobile account activation process between the account activation system 7 and the mobile device 3 will now be described with reference to the flow diagram of FIG. 4, and also FIG. 5, which comprises FIGS. 5a to 5f, illustrating a sequence of exemplary display screens that are presented to the user on the mobile device 3 in the transaction authorization process. As shown in the exemplary display screen 51 in FIG. 5a, an indication 53 that a mobile payment account is ready for activation is provided on the icon 55 for the account authentication application. The user launches the account authentication application, which begins the automated account activation process at step S4-1 by establishing a secure communication session between the mobile device 3 and the middleware server 16 via the communications server 17. At step S4-3, the middleware server 16 receives a request to activate a selected provisioned mobile payment account via the secure communication session. FIG. 5b shows an example display screen 57 which is displayed by the account authentication application for the user to select an account to activate from a list of mobile payment accounts that are ready to be activated. As the selected mobile payment account is a newly provisioned mobile payment account, the requirement to enter a security Personal Identification Number (PIN) to enable access to payment is disabled. The middleware server 16 and payment account issuer 10 then carry out an automated authentication of the mobile user associated with the selected mobile payment account, based on the stored validation data. In this embodiment, the authentication involves the middleware server 16 sending an ID&V question to the mobile device 3 via the secure communication session at step S4-5, and receiving and validating the user response to the transmitted ID&V question at step S4-7.

Additionally, those skilled in the art will appreciate that the level of security can be controlled and determined based on a risk profile for the mobile user. For example, a user that is requesting a mobile payment account for the first time may be classified as a high risk user and accordingly may be presented with a plurality of ID&V questions, for example three questions using validation information sourced from a third party to verify the user's identity with a higher level of confidence. Such ID&V questions may for example be of the form "Where did you live in 1994?", where the questions may be generated based on ID&V information obtainable from public records but where the user is the only person likely to know the answers. As mentioned above, the ID&V information itself need not be transmitted by the account activation system 7 over the cellular telephone network 11, and the ID&V questions and answers are never transmitted together in the same message, thus reducing the risk of identity theft and fraud.

A user may, on the other hand, be classified as a low risk user for example if that user is requesting an additional mobile payment account and therefore would already be registered on the account activation system 7 and the payment account issuer 10, or for example may have a mobile device and/or software that facilitates a more secure communication link with the account activation system 7. For a low risk user, a less complicated authentication process could be used, for example involving a single ID&V question based on user details previously provided to the account activation system 7.

Figure 5C:
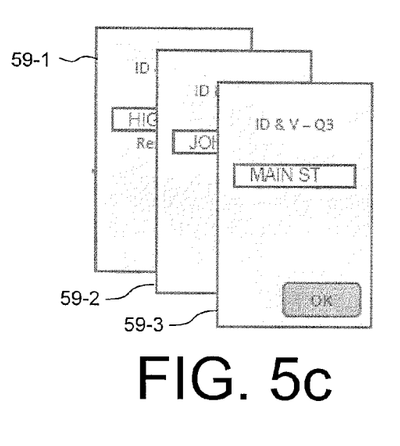

Therefore, at step S4-9, the middleware server 16 determines if another ID&V question is to be transmitted to the mobile device 3, and if so, steps S4-5 and S4-7 are repeated for the additional ID&V question. FIG. 5c illustrates three exemplary display screens 59-1, 59-2, 59-3 that are displayed to the user in sequence to facilitate input of answers to the ID&V questions which are transmitted back to the middleware server 16 for validation. The middleware server 16 may be configured to permit a predetermined number of incorrect answers before terminating the authentication and activation process, and requiring the user to resolve the activation process by conventional methods such as calling customer support for the account activation system.

The use of ID&V questions and validation of received answers advantageously provides an additional measure of security against identification theft on top of the secured communication channels that are in place, particularly because the present invention allows for real-time activation of a mobile payment account directly from a user's mobile device 3. For example, account creation may be requested immediately after the user has purchased the mobile phone or at any later time where the user may be in a public environment and at risk of a fraudster observing as the user enters his or her identification details into the mobile device 3. More devious methods for theft of input identification details may involve hacking or eavesdropping of the secured communication channels between the mobile device 3 and the account activation system 7. The automated user authentication steps of the account activation process advantageously reduce the risk of identity theft because a fraudster is prevented from unauthorized usage of a mobile payment account merely from any stolen answers to ID&V questions as the data that is transmitted (which may be sensitive data such as the user's social security number or date of birth) does not facilitate actual payment from an activated mobile payment account which is typically enabled by user entry of a correct PIN. The present invention further advantageously provides for this secure implementation while at the same time minimizing the delay in activating a provisioned mobile payment account so that a user can effectively activate a provisioned mobile payment account in real time.

Figure 5D:
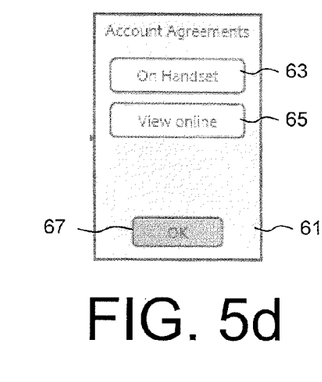

When the middleware server 16 determines at step S4-9 that no further ID&V questions are required and the identity of the mobile user has been automatically authenticated by validation of each the received user responses as compared to the stored validation data, the middleware server 16 may then wait for confirmation from the mobile device 3 that the user has agreed to the mobile payment account terms and conditions, at step S4-11. As shown in FIG. 5d, this may involve a display screen 61 on the mobile device 3 prompting the user to view account agreement documentation on the mobile device 3 itself, for example by pressing a button 63 labeled "On Handset", or to view the documentation online via a web browser, for example by pressing a button 65 labeled "View online". Alternatively or additionally, the user may request that the account agreement documentation be sent by e-mail. The user preference for viewing the account agreement documentation may be stored on the mobile device 3 for a later account activation process for additional mobile payment accounts. In an example, once the user has read and agreed to the mobile payment account terms and conditions set out in the account agreement documentation, the user may press the OK button 67 and the account authentication application sends a confirmation message back to the middleware server 16. As an alternative, the user may not be required to provide confirmation of agreement to any terms and conditions and may instead simply be provided with a welcome greeting screen to inform the user that he or she has been successfully authenticated with the account activation system 7. As yet a further alternative, if terms and conditions are not been delivered to the mobile device in the above exemplary way, the account activation system 7 may be arranged to dynamically ensure delivery of the account agreement documentation to the user by any other suitable method of delivery.

Figure 5E:
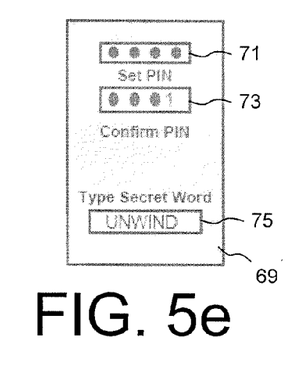
Figure 5F:
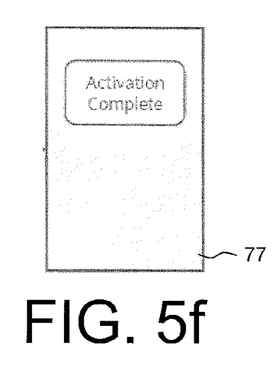

After the middleware server 16 has received confirmation at step S4-11 as necessary, then at step S4-13, the TSM server 18 systematically generates an unblock command which is sent back to the mobile device 3, via for example the TSM unit 15 of the communications server 13. In response to receiving the unblock command, the middleware server 16 changes the state of the mobile payment account to "Issuer PIN Unblocked" at step S4-15. Then, at step S4-17, the mobile device 3 prompts for and receives a PIN input by the user for the mobile payment account, and additionally, may also prompt for and receive a user input secret word for the mobile payment account. As shown in FIG. 5e, a display screen 69 may be displayed by the account authentication application of the mobile device 3 to prompt the user to set a PIN for the mobile payment account in a first input field 71, to confirm the PIN in a second input field 73. The user may additionally be prompted to input a secret word in a third input field 75. Requiring user input of a secret word may be further advantageously used to prevent phising for sensitive information and to guard against counterfeit applications. The mobile device 3 may store the user input issuer PIN for the mobile payment account in the payment account data 6 stored in the secure memory 4 so that the information is only known and accessible by the user. The stored user PIN for a mobile payment account may subsequently be required to be input by the user when executing the mobile payment wallet application 8 that is to access the payment account data 6 for the mobile payment account at a later time. At step S4-19, the mobile device 3 notifies the middleware server 16 that an issuer PIN for the mobile payment account has been set by the user on the mobile device 3. In response, at step S4-21 the middleware server 16 activates the mobile payment account, and at step S4-23, updates the state of the mobile payment account to "Active". FIG. 5f illustrates an example display screen 77 of the mobile device 3 informing the user that the provisioned mobile payment account is active and ready for use to carry out transactions with a merchant. The TSM server 18 may then transmit a message to the mobile device 3 to activate the transaction processing application if necessary, for example if this is the first time the user has activated a mobile payment account.

Summary and Advantages

A description of the components of a mobile payment account activation system embodying the present invention has been given. A detailed description has also been given of the functional operation of each component during an account provisioning and account activation process in the mobile payment system.

A number of advantages are achieved with the account activation system described above. As mentioned above, the account activation system can advantageously activate a new mobile payment account for a mobile user in real time, as the computer-implemented user authentication and activation processes are automated by the account activation system so that a mobile user can efficiently and securely activate an inactive mobile payment account provisioned on a mobile device, without requiring manual intervention to provide additional verification in order to complete the activation process, such as a preset pass code by way of a telephone call, or in person in store or in branch, or logging on to a website of an account issuer or bank through a web browser, or delivery of any authentication or verification documents between the user and the account issuer or bank by mail or post. The present invention thereby facilitates real time provisioning and activation of the mobile payment account ready to be used to carry out transactions at a merchant POS.

The account activation system can also be configured to adjust a level of security relating to the user authentication and activation process depending for example on a determined risk of the mobile user. Therefore, a lower risk mobile user may have the additional convenience of a simplified activation process, whereas an unfamiliar or higher risk mobile user will have a more complicated activation process, thereby reducing the chances of fraudulent account activation and identity theft.

The above described account activation system also has the advantage that the merchant POS terminal and the secure payment account issuers operate in a conventional manner. The system can therefore be easily incorporated into existing contactless mobile payment systems.

Computer Systems

Figure 6:
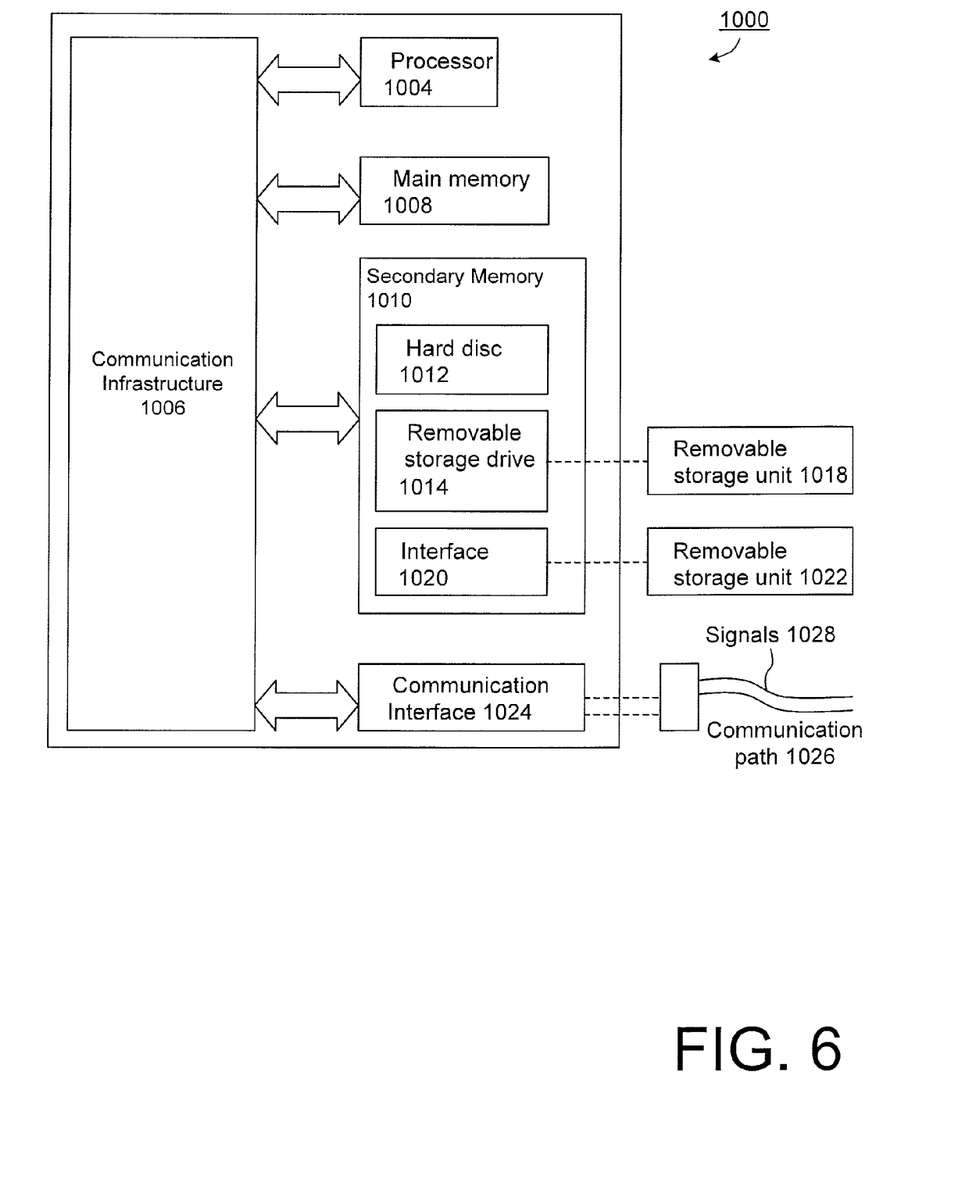
FIG. 6 is a block diagram of an example of a computer system on which one or more of the functions of the account activation system shown in FIG. 1 may be implemented.

The computer servers of the account activation system described herein may be implemented by computer systems such as computer system 1000 as shown in FIG. 6. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026.

Communication path 1026 carries signals 1028 and may be implemented using wire or cable, fiber optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

It will be understood that embodiments of the present invention are described herein by way of example only, and that various changes and modifications may be made without departing from the scope of the invention.

For example, in the embodiment described above, the mobile payment account is provisioned on a mobile handset which communicates with the account activation system via a cellular telephone network. As those skilled in the art will appreciate, instead of a mobile handset, other portable electronic devices configured for contactless payment with a merchant electronic POS and having suitable input and display means, may be adapted to carry out the functionality of real time provisioning and/or activation as described in the above embodiment. Additionally, those skilled in the art will appreciate that the portable electronic device may be configured to communicate with the account activation system via any other form of communication channel, such as a wired or wireless network connection, a Bluetooth connection, or the like. Alternatively, the mobile payment account data may be provisioned on the portable electronic device by means of data transfer for example via any suitable data communication path or by way of a computer readable medium.

In the embodiment described above, the mobile device is provisioned with a mobile payment account by the account activation system through secure transfer of data representing the mobile payment account, which data including data defining an amount of pre-paid funds transferred from the user's payment account issuer and/or data identifying a user's account at a payment account issuer from which funds can be transferred to a merchant bank to complete a transaction. As those skilled in the art will appreciate, the mobile device may instead or additionally be securely provisioned with data representing one or more other types of accounts, such as an insurance account, a loyalty and rewards scheme membership or the like, and the account activation system may be configured to conduct a secure data transfer to the mobile device of data representing such an account, for example including the account or membership number or any other type of secure reference number.

Alternative embodiments may be envisaged, which nevertheless fall within the scope of the following claims.

What is claimed is:

1. A mobile payment account management system for providing a mobile payment account associated with a portable electronic device to enable contactless payment at an electronic point of sale using a wallet application module on the portable electronic device, the system comprising one or more processors configured to:
    receive a request from the wallet application module on the portable electronic device, to create a mobile payment account, the request including data identifying the portable electronic device and an associated user;
    create a mobile payment account associated with the portable electronic device based on data received in the request, wherein the created mobile payment account includes data identifying a one-time activation servicing state of the mobile payment account as:
        a first inactive state of the mobile payment account indicating that the associated user must be verified by the account management system,
        a second inactive state of the mobile payment account indicating that the mobile wallet application must be configured for user access security, and then
        an active state of the mobile payment account indicating that the user is verified and user access security is configured;
    transmit data identifying the created mobile payment account to the wallet application module on the portable electronic device, wherein the activation servicing state of the mobile payment account is initially set to the first inactive state;
    receive, from the portable electronic device, a user validation response, verifying the identity of the associated user based on the received validation response, and in response, set the activation servicing state of the mobile payment account to the second inactive state; and
    receive data indicating that user access security has been configured for the mobile wallet application, and in response set the activation servicing state of the mobile payment account to the active state, whereby the wallet application module is enabled for contactless payment for future transactions with multiple merchants using the activated mobile payment account.

2. The system of claim 1, wherein the one or more processors is configured to verify the identity of the associated user by receiving, from the portable electronic device, a validation answer to at least one validation question, and automatically authenticating the user based on the received validation answer.

3. The system of claim 2, wherein the validation questions and answers are based on identification and validation information associated with the new mobile payment account.

4. The system of claim 3, wherein the validation questions and answers are further based on additional identification and validation information provided by a third party.

5. The system of claim 2, wherein the identification and validation information is not transmitted to the portable electronic device.

6. The system of claim 2, wherein the one or more processors are further configured to determine a number of validation questions to be transmitted to the portable electronic device based on a determined level of security associated with the user.

7. The system of claim 1, wherein the one or more processors are configured to automatically authenticate a user associated with the new mobile payment account substantially in real-time.

8. The system of claim 1, wherein the one or more processors are further configured to create the mobile payment account by:
- transmitting the data included in the received request to create a mobile payment account to a payment account issuer;
- receiving embossing data from the payment account issuer relating to an established payment account; and
- creating mobile payment account data including data from the received embossing data and data identifying the associated portable electronic device.

9. The system of claim 1, wherein the one or more processors are further configured to receive a request from the wallet application module to initiate the identity verification process in response to notification by the wallet application module that the mobile payment account is in the first inactive state.

10. A portable electronic device comprising:
- a contactless data communication interface;
- a wallet application module for contactless payment at an electronic point of sale via the contactless data communication interface, the wallet application module configured to:
- transmit a request to create a mobile payment account at mobile payment account management system, the request including data identifying the portable electronic device and an associated user;
- receive and store data identifying the created mobile payment account in a secure memory, wherein the mobile payment account has a one-time activation servicing state that is: a first inactive state of the mobile payment account indicating that the associated user must be verified by the account management system, a second inactive state of the mobile payment account indicating that the mobile wallet application must be configured for user access security, and an active state of the mobile payment account indicating that the user is verified and user access security is configured;
- prompt the user to initiate an identity verification process with the mobile payment account management system;
- transmit user input for identity verification by the mobile account management system;
- receive data from the mobile payment account management system indicating that the activation servicing state of the mobile payment account is set to the second inactive state, and in response, prompt the user to configure user access security; and
- transmit data indicating that the mobile wallet application is configured for user access security to the mobile payment account management system, whereby the wallet application module is enabled for contactless payment for future transactions with multiple merchants using the activated mobile payment account.

11. The portable electronic device of claim 10, wherein configuring user access security of the mobile wallet application comprises setting a access PIN or passcode.

* * * * *